US012544748B2

(12) United States Patent
Poss et al.

(10) Patent No.: US 12,544,748 B2
(45) Date of Patent: Feb. 10, 2026

(54) METAL BODIES AND METHOD FOR PRODUCTION THEREOF

(71) Applicant: Alantum Europe GmbH, Munich (DE)

(72) Inventors: René Poss, Karlsruhe (DE); Monika Berweiler, Maintal (DE); Meike Roos, Büdingen (DE)

(73) Assignee: Alantum Europe GmbH, Munich (DE)

( * ) Notice: Subject to any disclaimer, the term of this patent is extended or adjusted under 35 U.S.C. 154(b) by 924 days.

(21) Appl. No.: 17/762,986

(22) PCT Filed: Sep. 25, 2020

(86) PCT No.: PCT/EP2020/076822
§ 371 (c)(1),
(2) Date: Mar. 23, 2022

(87) PCT Pub. No.: WO2021/058702
PCT Pub. Date: Apr. 1, 2021

(65) Prior Publication Data
US 2022/0387986 A1 Dec. 8, 2022

(30) Foreign Application Priority Data
Sep. 25, 2019 (EP) .................................... 19199638

(51) Int. Cl.
*B01J 21/02* (2006.01)
*B01J 21/06* (2006.01)
(Continued)

(52) U.S. Cl.
CPC .......... *B01J 37/0225* (2013.01); *B01J 23/72* (2013.01); *B01J 23/745* (2013.01); *B01J 23/75* (2013.01);
(Continued)

(58) Field of Classification Search
CPC ... B01J 21/02; B01J 21/06; B01J 21/10; B01J 23/72; B01J 23/745; B01J 23/75;
(Continued)

(56) References Cited

U.S. PATENT DOCUMENTS

| 4,049,580 A | 9/1977 | Oden et al. |
| 4,491,564 A | 1/1985 | Gray |

(Continued)

FOREIGN PATENT DOCUMENTS

| CN | 1798717 | 7/2006 |
| CN | 101254466 | 9/2008 |

(Continued)

OTHER PUBLICATIONS

Amendment & Response for copending U.S. Appl. No. 17/053,340, filed Aug. 8, 2023.

(Continued)

*Primary Examiner* — Cam N. Nguyen
(74) *Attorney, Agent, or Firm* — Dickinson Wright PLLC (57) ABSTRACT

The present invention relates to methods for producing coated metal bodies by applying a metal powder composition to a metal body, such that a coated metal body is obtained, the coating of which contains one or more wax components; heating the coated metal body to the melting temperature of at least one of the wax components and subsequent cooling to room temperature, such that a coated metal body is obtained; and thermally treating the coated metal body in order to achieve alloy formation between metal portions of metal body and metal powder composition, wherein the metal body comprises nickel, cobalt, copper and/or iron and the metal powder composition comprises a metal component in powder form, which contains aluminium, silicon or magnesium in elemental or alloyed form. By melting and cooling the wax, the method makes (Continued)

air-dried

After "active drying" at 140°C metal bodies having a more uniform alloy coverage accessible. The invention furthermore relates to methods wherein the metal body is subsequently treated with a basic solution. The present invention additionally comprises the metal bodies obtainable by the method according to the invention, which find application as load-bearing and structural components, for example, and in catalyst converter technology.

20 Claims, 5 Drawing Sheets

(51) Int. Cl.
| | | |
|---|---|---|
| B01J 21/10 | (2006.01) | |
| B01J 23/72 | (2006.01) | |
| B01J 23/745 | (2006.01) | |
| B01J 23/75 | (2006.01) | |
| B01J 23/755 | (2006.01) | |
| B01J 35/56 | (2024.01) | |
| B01J 35/64 | (2024.01) | |
| B01J 37/00 | (2006.01) | |
| B01J 37/02 | (2006.01) | |
| B01J 37/08 | (2006.01) | |
| B22F 3/10 | (2006.01) | |
| B22F 3/11 | (2006.01) | |
| B22F 3/24 | (2006.01) | |
| B22F 7/04 | (2006.01) | |
| B22F 7/06 | (2006.01) | |

(52) U.S. Cl.
CPC ............ *B01J 23/755* (2013.01); *B01J 35/657* (2024.01); *B01J 37/0018* (2013.01); *B01J 37/08* (2013.01); *B22F 3/1021* (2013.01); *B22F 3/114* (2013.01); *B22F 3/24* (2013.01); *B22F 7/04* (2013.01); *B22F 7/062* (2013.01); *B22F 2003/242* (2013.01); *B22F 2003/244* (2013.01); *B22F 2003/248* (2013.01); *B22F 2007/045* (2013.01); *B22F 2007/066* (2013.01)

(58) Field of Classification Search
CPC .. B01J 23/755; B01J 37/0018; B01J 37/0225; B01J 37/08; B01J 35/56; B01J 35/657; B22F 3/24; B22F 3/114; B22F 3/1021; B22F 7/04; B22F 7/062
See application file for complete search history.

(56) References Cited

U.S. PATENT DOCUMENTS

| | | | |
|---|---|---|---|
| 5,045,277 A | 9/1991 | Penkunas et al. | |
| 5,851,599 A | 12/1998 | Harada et al. | |
| 6,262,307 B1* | 7/2001 | Freund | C07B 43/04 |
| | | | 568/891 |
| 6,337,300 B1* | 1/2002 | Sauer | B01J 25/00 |
| | | | 502/301 |
| 6,436,166 B2 | 8/2002 | Arvidsson et al. | |
| 6,524,522 B2* | 2/2003 | Vaidyanathan | B22F 1/10 |
| | | | 419/36 |
| 6,530,514 B2 | 3/2003 | Shabtay | |
| 6,573,213 B1* | 6/2003 | Ostgard | B01J 35/52 |
| | | | 502/301 |
| 6,747,180 B2* | 6/2004 | Ostgard | B01J 25/02 |
| | | | 502/301 |
| 8,758,675 B2 | 6/2014 | Böhm et al. | |
| 10,160,916 B2* | 12/2018 | Yang | C10G 2/34 |
| 10,160,917 B2* | 12/2018 | Yang | C10G 2/34 |
| 10,596,556 B2 | 3/2020 | Radivojevic et al. | |
| 10,675,682 B2 | 6/2020 | Nakamura et al. | |
| 10,682,697 B2* | 6/2020 | Nakamura | B22F 3/22 |
| 10,814,390 B2 | 10/2020 | Skszek et al. | |
| 11,090,637 B2 | 8/2021 | Wieland et al. | |
| 11,173,479 B2 | 11/2021 | Schroeter et al. | |
| 11,260,375 B2* | 3/2022 | Berweiler | B01J 35/32 |
| 11,401,224 B2 | 8/2022 | Roos et al. | |
| 11,819,832 B2 | 11/2023 | Roos et al. | |
| 2002/0038051 A1* | 3/2002 | Ostgard | C07C 227/02 |
| | | | 502/301 |
| 2004/0260120 A1* | 12/2004 | Ostgard | C07C 51/295 |
| | | | 502/301 |
| 2005/0275143 A1 | 12/2005 | Toth | |
| 2008/0031767 A1 | 2/2008 | Naumann et al. | |
| 2008/0171218 A1 | 7/2008 | Naumann et al. | |
| 2008/0214387 A1* | 9/2008 | Ostgard | C07C 253/30 |
| | | | 502/313 |
| 2009/0018366 A1* | 1/2009 | Berweiler | C07C 29/141 |
| | | | 568/861 |
| 2009/0202812 A1* | 8/2009 | Schaeffler | B22F 3/1125 |
| | | | 428/312.2 |
| 2010/0174116 A1* | 7/2010 | Ostgard | C07C 209/36 |
| | | | 564/422 |
| 2010/0185026 A1* | 7/2010 | Ostgard | C07C 209/36 |
| | | | 568/934 |
| 2010/0204517 A1* | 8/2010 | Ostgard | B01J 25/02 |
| | | | 564/422 |
| 2011/0218362 A1* | 9/2011 | Ostgard | C07C 209/48 |
| | | | 564/490 |
| 2011/0281723 A1 | 11/2011 | Tsai et al. | |
| 2012/0141670 A1 | 6/2012 | Walther et al. | |
| 2012/0329889 A1 | 12/2012 | Yang et al. | |
| 2014/0221700 A1 | 8/2014 | Radivojevic et al. | |
| 2017/0141074 A1 | 5/2017 | Schäfer et al. | |
| 2017/0167041 A1 | 6/2017 | Poss et al. | |
| 2017/0226044 A1* | 8/2017 | Rittsteiger | B01J 37/06 |
| 2018/0010257 A1 | 1/2018 | Braun et al. | |
| 2018/0230081 A1* | 8/2018 | Rüfer | B01J 35/615 |
| 2019/0210010 A1 | 7/2019 | Pinkos et al. | |
| 2019/0232256 A1* | 8/2019 | Berweiler | B01J 25/02 |
| 2019/0232257 A1 | 8/2019 | Wieland et al. | |
| 2019/0344248 A1 | 11/2019 | Pinkos et al. | |
| 2020/0016579 A1 | 1/2020 | Schreiber et al. | |
| 2021/0010146 A1 | 1/2021 | Poss et al. | |
| 2021/0032185 A1 | 2/2021 | Roos et al. | |
| 2021/0275996 A1 | 9/2021 | Roos et al. | |
| 2021/0276091 A1 | 9/2021 | Poss et al. | |
| 2022/0362757 A1 | 11/2022 | Poss et al. | |
| 2022/0395816 A1 | 12/2022 | Poss et al. | |
| 2023/0001388 A1 | 1/2023 | Poss et al. | |

FOREIGN PATENT DOCUMENTS

| | | |
|---|---|---|
| CN | 101391222 | 3/2009 |
| CN | 101537360 | 9/2009 |
| CN | 101537361 | 9/2009 |
| CN | 101549297 | 10/2009 |
| CN | 101921924 | 12/2010 |
| CN | 102121090 | 7/2011 |
| CN | 106801159 | 6/2017 |
| CN | 109175382 | 1/2019 |
| DE | 102009015176 | 7/2011 |
| EP | 2 764 916 | 8/2014 |
| JP | 2002241102 | 8/2002 |
| JP | 2005205265 | 8/2005 |
| JP | 2006-049595 | 2/2006 |
| JP | 2016513173 A | 5/2016 |
| KR | 101857435 | 5/2018 |
| WO | WO 95/11752 | 5/1995 |
| WO | WO 2015/028738 | 3/2015 |
| WO | 2019057533 A1 | 3/2019 |

OTHER PUBLICATIONS

Final Office Action for copending U.S. Appl. No. 17/053,340, mailed Aug. 16, 2023.
Request for Continued Examination for copending U.S. Appl. No. 17/053,340, filed Nov. 3, 2023.
Amendment & Response th Accompany RCE for copending U.S. Appl. No. 17/053,340, filed Nov. 3, 2023.

(56) References Cited

OTHER PUBLICATIONS

Amendment & Response to Office Action for copending U.S. Appl. No. 17/053,340, filed Oct. 12, 2022.
Final Office Action for copending U.S. Appl. No. 17/053,340, mailed Jan. 5, 2023.
Request for Continued Examination for copending U.S. Appl. No. 17/053,340, filed Apr. 3, 2023.
Amendment & Response to Accompany RCE for copending U.S. Appl. No. 17/053,340, filed Apr. 3, 2023.
International Search Report for international application PCT/EP2022/056426, filed Mar. 14, 2022, corresponding to copending U.S. Appl. No. 18/283,156.
Revised version of the International Search Report for international application PCT/EP2022/056426, filed Mar. 14, 2022, corresponding to copending U.S. Appl. No. 18/283,156.
Written Opinion of the International Searching Authority for international application PCT/EP2022/056426, filed Mar. 14, 2022, corresponding to copending U.S. Appl. No. 18/283,156.
Revised version of the Written Opinion of the International Searching Authority for international application PCT/EP2022/056426, filed Mar. 14, 2022, corresponding to copending U.S. Appl. No. 18/283,156.
International Preliminary Report on Patentability for international application PCT/EP2022/056426, filed Mar. 14, 2022, corresponding to copending U.S. Appl. No. 18/283,156.
European Search Report and Search Opinion for EP 21164243 filed Mar. 23, 2021, corresponding to PCT/EP2022/056426; with partial English language machine translation of the Search Opinion.
Rausch, et al., "Morphology and Utilization of Smooth Hydrogen-Evolving Raney Nickel Cathode Coatings and Porous Sintered-Nickel Cathodes," *J. Electrochem. Soc.* 143(9):2852-2862 (Sep. 1996).
U.S. Appl. No. 18/283,156, filed Sep. 20, 2023, Roos.
U.S. Appl. No. 18/439,722, filed Feb. 12, 2024, Poss.
English language translation of the International Search Report for corresponding international application PCT/EP2020/076822, filed Sep. 25, 2020.
English language translation of the Written Opinion of the International Searching Authority for corresponding international application PCT/EP2020/076822, filed Sep. 25, 2020.
International Preliminary Report on Patentability for corresponding international application PCT/EP2020/076822, filed Sep. 25, 2020.
European Search Report and Search Opinion for EP 19199638 filed Sep. 25, 2019, corresponding to international application PCT/EP2020/076822; with partial English language machine translation of the Search Opinion.
English language translation of the International Search Report for international application PCT/EP2020/076825, filed Sep. 25, 2020, corresponding to copending U.S. Appl. No. 17/762,732.
English language translation of the Written Opinion of the International Searching Authority for international application PCT/EP2020/076825, filed Sep. 25, 2020, corresponding to copending U.S. Appl. No. 17/762,732.
International Preliminary Report on Patentability for international application PCT/EP2020/076825, filed Sep. 25, 2020, corresponding to copending U.S. Appl. No. 17/762,732.
English language translation of the International Search Report for PCT/EP2020/076854, filed Sep. 25, 2020, corresponding to copending U.S. Appl. No. 17/762,730.
English language translation of the Written Opinion of the International Searching Authority for international application PCT/EP2020/076854, filed Sep. 25, 2020, corresponding to copending U.S. Appl. No. 17/762,730.
English language translation of the International Preliminary Report on Patentability for international application PCT/EP2020/076854, filed Sep. 25, 2020, corresponding to copending U.S. Appl. No. 17/762,730.
European Search Report and Search Opinion for EP 19199651 filed Sep. 25, 2019, corresponding to PCT/EP2020/076854 and PCT/EP2020/076825; with partial English language machine translation of the Search Opinion.
English language translation of the International Search Report for international application PCT/EP2020/076824, filed Sep. 25, 2020, corresponding to copending U.S. Appl. No. 17/762,848.
English language translation of the Written Opinion of the International Searching Authority for international application PCT/EP2020/076824, filed Sep. 25, 2020, corresponding to copending U.S. Appl. No. 17/762,848.
International Preliminary Report on Patentability for international application PCT/EP2020/076824, filed Sep. 25, 2020, corresponding to copending U.S. Appl. No. 17/762,848.
European Search Report and Search Opinion for EP 19199659 filed Sep. 25, 2019, corresponding to PCT/EP2020/076824; with partial English language machine translation of the Search Opinion.
English language translation of the International Search Report for international application PCT/EP2020/076826, filed Sep. 25, 2020, corresponding to copending U.S. Appl. No. 17/053,340.
English language translation of the Written Opinion of the International Searching Authority for international application PCT/EP2020/076826, filed Sep. 25, 2020, corresponding to copending U.S. Appl. No. 17/053,340.
International Preliminary Report on Patentability for international application PCT/EP2020/076826, filed Sep. 25, 2020, corresponding to copending U.S. Appl. No. 17/053,340.
European Search Report and Search Opinion for EP 19199643 filed Sep. 25, 2019, corresponding to PCT/EP2020/076826; with partial English language machine translation of the Search Opinion.
Chang, et al., "A thermally self-sustaining solid oxide fuel cell system at ultra-lo operating temperature (319 C)," *Energy* 104(20):107-113 (Apr. 2016).
Wen-Wen, et al., "Synthesis and Compression Property of Oxidation-Resistant Ni—Al Foams," *Acta. Metall. Sin.* 30(1):965-972 (Mar. 2017).
Yashnik, et al., "High-Performance Mn—A—O Catalyst on Reticulated Foam Materials for Environmentally Friendly Catalytic Combustion," *Eurasian Chemico-Technological Journal* 17(2):145-158 (Jan. 2015).
Ullman's Encyclopedia of Industrial Chemistry, "Metallic Foams" chapter, published online on Jul. 15, 2012, DOI: 25 10.1002/14356007.c16_c01.pub2.
Restriction Requirement for copending U.S. Appl. No. 17/053,340, mailed Feb. 28, 2022.
Response to Restriction Requirement for copending U.S. Appl. No. 17/053,340, filed Apr. 19, 2022.
U.S. Appl. No. 16/969,607, filed Aug. 13, 2020, US-2021/0032185 A1, Feb. 4, 2021, Roos.
U.S. Appl. No. 17/053,340, filed Nov. 5, 2020, US-2021/0276091 A1, Sep. 9, 2021, Poss.
U.S. Appl. No. 17/059,488, filed Nov. 29, 2020, US-2021/0275996 A1, Sep. 9, 2021, Roos.
U.S. Appl. No. 17/762,730, filed Mar. 23, 2022, Poss.
U.S. Appl. No. 17/762,732, filed Mar. 23, 2022, Poss
U.S. Appl. No. 17/762,848, filed Mar. 23, 2022, Poss.
Non-Final Office Action for copending U.S. Appl. No. 17/053,340, mailed May 19, 2023.
Non Final Office Action for copending U.S. Appl. No. 17/053,340, mailed Jul. 13, 2022.
Notice of Reasons for Refusal dated Nov. 12, 2024 corresponding to Japanese Application No. 2022-519029, 8 pages.

* cited by examiner

METAL BODIES AND METHOD FOR PRODUCTION THEREOF

CROSS REFERENCE TO RELATED APPLICATIONS

The present application is US national stage of international application PCT/EP2020/076822, which had an international filing date of Sep. 25, 2020 and which was published on Apr. 1, 2021. The PCT application claims priority to EP 19199638.8, filed on Sep. 25, 2019. The content of these prior filings is hereby incorporated by reference in its entirety.

BACKGROUND

The present invention relates to processes for preparing coated metal bodies, in which metal powder compositions are applied to metal bodies so as to obtain coated metal bodies, the coating of which contains one or more wax components. These metal bodies are subsequently heated up to the melting temperature of the wax, cooled down again to room temperature and then treated thermally, such that alloy formation between parts of the metal body and the metal powder applied is achieved. The melting and subsequent cooling of the wax enables access to metal bodies having more uniform alloy coverage. One field of use for processes of this kind is in sintering technology. The present invention further relates to processes in which these thermally treated metal bodies are then treated with a basic solution. One field of use for processes of this kind is in the production of catalysts. The present invention further relates to the metal bodies obtainable by the presently disclosed processes, which find use, for example, as support and structure components and in catalyst technology.

PRIOR ART

Processes for producing alloy-coated metal bodies are known from the prior art, for example from WO2019057533A1. Metal powders are applied therein to metal bodies, which are subsequently treated thermally so as to form alloys in the contact region of metal body and metal powder.

A problem with these processes is the occurrence of inhomogeneous alloy coverage of the metal bodies, meaning that some parts of the surface of the metal bodies have a high alloy coverage and some parts a low alloy coverage. According to the end use envisaged, this in turn can entail various disadvantages. The cause of the inhomogeneous alloy coverage is not clear to date.

With regard to the various possible uses of alloy-coated metal bodies, there is a need for processes for production thereof in which more homogeneous alloy coverage of the metal bodies is achieved.

THE PRESENT INVENTION

The present invention provides corresponding processes in which more uniform alloy coverage of the metal bodies is achieved. Processes according to the invention for production of coated metal bodies comprise the following steps:
  (a) applying a metal powder composition to a metal body so as to obtain a coated metal body 1, the coating of which contains one or more wax components,
  (b) heating the coated metal body 1 up to the melting temperature of at least one of the wax components and then cooling it down to room temperature so as to obtain a coated metal body 2,
  (c) treating the coated metal body 2 thermally in order to achieve alloy formation between metallic components of metal body and metal powder composition, so as to obtain metal body 3,
wherein the metal body used in step (a) comprises a metal component selected from the following group: nickel, cobalt, copper, iron, and
wherein the metal powder composition used in step (a) comprises a pulverulent metal component containing aluminium, silicon or magnesium in elemental or alloyed form.

By contrast with the prior art processes, in the processes according to the invention, prior to the thermal treatment for alloy formation, a wax is first melted and then cooled again (cf. step (b)). Experimental results that have been obtained in connection with the present invention show that it is necessary to actually execute the melting and cooling of the wax described in step (b) prior to the thermal treatment for alloy formation in order to achieve the more uniform alloy coverage intended. It is not sufficient merely to add wax to the metal powder and to conduct the thermal treatment for alloy formation (step (c)) after the application of the metal powder (step (a)).

In step (a) of process 1 according to the invention, a metal powder composition is applied to a metal body so as to obtain a coated metal body 1, the coating of which contains one or more wax components.

The metal powder composition can be applied in various ways in step (a) of the process according to the invention, for example by contacting the metal body with the metal powder composition by rolling or dipping, or applying the metal powder composition by spraying, scattering or pouring. For this purpose, the metal powder composition may be in the form of a suspension or in the form of a powder.

Preferably, the actual applying of the metal powder composition to the metal body in step (a) of the process according to the invention is preceded by prior impregnation of the metal body with a binder. The impregnating can be effected, for example, by spraying the binder or dipping the metal body into the binder, but is not limited to these options. The metal powder composition can subsequently be applied to the metal body thus prepared.

Alternatively, it is possible to apply binder and metal powder composition in one step. For this purpose, either the metal powder composition is suspended in the liquid binder itself prior to the applying or metal powder composition and binder are suspended in an auxiliary liquid F.

The binder is a composition that can be converted completely to gaseous products by thermal treatment within the temperature range from 100 to 400° C., comprising an organic compound that promotes adhesion of the metal powder composition on the metal body. The organic compound is preferably selected from the following group: polyethyleneimines (PEI), polyvinylpyrrolidone (PVP), ethylene glycol, mixtures of these compounds. Particular preference is given to PEI. The molecular weight of the polyvinylpyrrolidone is preferably within a range from 10000 to 1300000 g/mol. The molecular weight of the polyethyleneimine is preferably within a range from 10000 to 1300000 g/mol. The molecular weight of the polyethyleneimine (PEI) is more preferably within a range from 700000 to 800000 g/mol.

Auxiliary liquid F must be capable of suspending metal powder composition and binder and be convertible completely to gaseous products by thermal treatment within the temperature range from 100 to 400° C. Preferably, auxiliary liquid F is selected from the following group: water, ethylene glycol, PVP and mixtures of these compounds. Typically, when auxiliary liquid is used, the binder is suspended in water at a concentration in the range from 1% to 10% by weight, then the metal powder composition is suspended in this suspension.

In order to achieve the effect that a coated metal body 1, the coating of which contains one or more wax components, is obtained at the end of step (a) of the process according to the invention, one or more wax components of the coating must be added. For this purpose, it is possible to choose the following procedures, individually or in combination:
(i) one or more wax components are added to the metal powder composition,
(ii) one or more wax components are added to the binder,
(iii) one or more wax components are added to the auxiliary liquid F,
(iv) one or more wax components are applied to the uncoated metal body,
(v) one or more wax components are applied to the binder-coated metal body,
(vi) one or more wax components are applied to the metal body 1 coated with the metal powder composition.

In a preferred embodiment of the present invention, one or more wax components are added to the metal powder composition (procedure (i)).

Waxes are substances defined by their mechanical and physical properties. Their chemical composition and origin can be very different. Waxes differ from similar synthetic or natural products (e.g. resins, plastic masses, metal soaps etc.) mainly in that they are converted to the molten, low-viscosity state generally between about 50 and 90° C., in exceptional cases even up to about 250° C., and are virtually free of ash-forming compounds. According to the origin, the waxes are divided into three groups, namely (i) natural waxes, including plant waxes (e.g. candelilla wax, carnauba wax, japan wax, esparto grass wax, cork wax, guaruma wax, rice germ oil wax, sugarcane wax, ouricury wax, montan wax etc.), animal waxes (e.g. beeswax, shellac wax, spermaceti, lanolin or wool wax, uropygial grease etc.) and mineral waxes (e.g. ceresin, ozokerite etc.); (ii) chemically modified waxes, including hard waxes (e.g. montan ester waxes, sasol waxes, hydrogenated jojoba waxes etc.); and (iii) synthetic waxes, including polyalkylene waxes, polyalkylene glycol waxes (e.g. polyethylene glycol waxes) etc. The main constituent of natural recent ("renewable") waxes is esters of long-chain fatty acids (wax acids) with long-chain fatty alcohols, triterpene or steroid alcohols; these wax esters also contain free carboxyl and/or hydroxyl groups. Natural fossil waxes, for example from brown coal or mineral oil, just like waxes from Fischer-Tropsch synthesis or polyalkylene waxes (e.g. polyethylene waxes), consist mainly of straight-chain hydrocarbons; however, the former may also contain branched or cycloaliphatic hydrocarbons according to their provenance. These "hydrocarbon waxes" are frequently functionalized by subsequent oxidation or, in the case of the polyolefin waxes, by comonomers with carboxyl groups. For further details of the term "waxes", reference is made to Rompp Chemielexikon [Rompp's Chemical Lexicon], 10th edition, volume 6, Georg Thieme Verlag Stuttgart/New York, page 4906, 1999, under "waxes", and the literature referenced therein, especially Cosm. Toil. 101, 49 (1986) and DGF-Einheitsmethoden, Abteilung M—Wachse and Wachsprodukte [German Society for Fat Science Standard Methods, Section M—Waxes and Wax Products], 7th supplement May 1999, Stuttgart: Wissenschaftliche Verlagsgesellschaft, and the aforementioned literature references are hereby incorporated fully into the present application by reference.

A substance or substance mixture is referred to as a wax component in the context of the present invention if it
(i) is firm and kneadable at 20° C., and
(ii) melts without decomposition in the temperature region of 40° C., and
(iii) can be converted fully to gaseous products by thermolysis within the temperature range from 100 to 400° C.

Preference is given to wax components that are hydrophobic, meaning that surfaces of the substances or substance mixtures or surfaces coated with the substances or substance mixtures form a contact angle with water greater than 90 degrees.

All wax components preferably have a solidification temperature in the range from 90 to 250° C.

Particular preference is given to wax components having solidification temperatures between 45 and 160° C., especially those having solidification temperatures between 100 and 160° C.

More preferably, the wax component is a stearamide wax (ethylenebis(stearamide), EBS).

The total amount of all wax components is chosen such that its proportion of the total mass of the coating of metal bodies 2 (obtained after step (b) of the process according to the invention) is between 0.5% and 5% by weight. Preferably, the proportion of the total amount of all wax components in the total mass of the coating of metal bodies 2 is between 1% by weight and 4% by weight. The total mass of the coating of metal bodies 2 corresponds to the difference in mass between metal body 2 and the uncoated metal body used in step (a).

According to the invention, the metal body used in step (a) comprises a metal component selected from the following group: nickel, cobalt, copper, iron.

In a preferred embodiment, the metal body used in step (a) consists of one of the following:
(i) metallic nickel,
(ii) metallic cobalt,
(iii) metallic copper,
(iv) alloy of nickel and cobalt,
(v) alloy of nickel and copper,
(vi) arrangements of two superposed layers of two individual metallic components, in which case one of the metallic components forms an inner layer of the metal body and the other metallic component the outer layer of the metal body, wherein the metallic components are selected from the list of the following combinations: nickel on the inside and cobalt on the outside, iron on the inside and nickel on the outside.

In a further preferred embodiment, the metal body used in step (a) consists of a metal selected from the following group: Ni, Fe, Co, Cu.

The metal bodies used in step (a) of the process according to the invention may have any desired shape, for example cubic, cuboidal, cylindrical etc. The metal bodies may alternatively take the form of foams, meshes, weaves, loop-drawn knits or loop-formed knits, which may in turn be formed to monoliths. The metal bodies used in step (a) of the process according to the invention preferably take the form of foams, meshes, weaves, loop-drawn knits or loop-formed knits.

In a particularly preferred embodiment of the process according to the invention, the metal body used in step (a) is a metal foam body. In connection with the present invention, a metal foam body is understood to mean a metal body in the form of a foam as disclosed, for example, in Ullmann's Encyclopedia of Industrial Chemistry, "Metallic Foams" chapter, published online on 15 Jul. 2012, DOI: 10.1002/14356007.c16_c01.pub2. Suitable metal foams are in principle those having different morphological properties with regard to pore size and shape, layer thickness, area density, geometric surface area, porosity, etc. Preferably, a metal foam of Ni, Cu and/or Co has a density in the range from 400 to 1500 g/m$^2$, a pore size of 400 to 3000 μm, preferably of 400 to 800 μm, and a thickness in the range from 0.5 to 10 mm, preferably of 1.0 to 5.0 mm. Preparation can be effected in a manner known per se. For example, it is possible to coat a foam made of an organic polymer with at least one first metal and then to remove the polymer, for example by thermolysis or dissolution in a suitable solvent, giving a metal foam. For coating with at least one first metal or a precursor thereof, the foam made of the organic polymer may be contacted with a solution or suspension containing the first metal. This may be done for example by spraying or dipping. Deposition by means of chemical vapour deposition (CVD) is also possible. For example, a polyurethane foam may be coated with the first metal and then the polyurethane foam thermolysed.

A polymer foam suitable for producing shaped articles in the form of a foam preferably has a pore size within the range from 100 to 5000 μm, more preferably from 450 to 4000 μm and in particular from 450 to 3000 μm. A suitable polymer foam preferably has a layer thickness of 5 to 60 mm, more preferably of 10 to 30 mm. A suitable polymer foam preferably has a density of 300 to 1200 kg/m$^3$. The specific surface area is preferably within a range from 100 to 20 000 m$^2$/m$^3$, more preferably 1000 to 6000 m$^2$/m$^3$. The porosity is preferably within a range from 0.50 to 0.95.

The metal powder composition used in step (a) of the process according to the invention may, as well as one or more pulverulent metal components, also contain one or more wax components and/or additions that contribute to enhancement of flowability or water resistance. Such additions must be fully convertible to gaseous products by thermal treatment in the temperature range from 100 to 400° C. The metal powder composition used in step (a) of the process according to the invention comprises one or more pulverulent metal components selected from the following group: aluminium, aluminium alloys, silicon, silicon alloys, magnesium, magnesium alloys. In a preferred embodiment, the metal powder composition used in step (a) comprises one or more pulverulent metal components selected from the following group: aluminium, silicon, magnesium, alloys of aluminium and chromium, alloys of aluminium and molybdenum, alloys of aluminium and copper, alloys of aluminium and iron, alloys of aluminium and iron and chromium, alloys of aluminium and titanium, alloys of aluminium and molybdenum and titanium, alloys of silicon and chromium, alloys of silicon and molybdenum, alloys of silicon and copper, alloys of silicon and iron, alloys of silicon and iron and chromium, alloys of silicon and titanium, alloys of silicon and molybdenum and titanium, alloys of magnesium and chromium, alloys of magnesium and molybdenum, alloys of magnesium and copper, alloys of magnesium and iron, alloys of magnesium and iron and chromium, alloys of magnesium and titanium, alloys of magnesium and molybdenum and titanium. In a further preferred embodiment of the process according to the invention, the metal powder composition used in step (a) comprises pulverulent aluminium. In a particularly preferred embodiment of the process according to the invention, the metal powder composition used in step (a) consists of pulverulent aluminium and one or more pulverulent wax components.

In a preferred embodiment, the metal powder composition used in step (a) of the process according to the invention contains one or more wax components. The addition of wax components increases the flowability of the metal powder composition and hence the technical conveyability thereof. Moreover, wax components protect the metal powder composition from water absorption and also reduce the degree of chemical reactions between the pulverulent metals and water, and hence also suppress any formation of hydrogen.

The metal powder composition preferably has a metal component content in the range from 80% to 99.8% by weight. Preference is given here to compositions in which the metal component particles have a particle size of not less than 5 μm and not greater than 200 μm. Particular preference is given to compositions in which 95% of the metal component particles have a particle size of not less than 5 μm and not greater than 75 μm. It may be the case that the composition, as well the metal component in elemental form, also contains metal components in oxidized form. This oxidized component is typically in the form of oxidic compounds, for example oxides, hydroxides and/or carbonates. The proportion by mass of the oxidized component is typically in the range from 0.05% to 10% by weight of the total mass of the metal powder composition.

In step (b) of the process according to the invention, the coated metal body 1 is heated up to the melting temperature of at least one of the wax components and then cooled down to room temperature so as to obtain a coated metal body 2. Typically, the coated metal body 1 is heated in this step to a temperature in the range from 90 to 250° C. The heat source used to heat the coated metal body 1 in step (b) is typically an oven, but other heat sources are also usable, for example infrared lamps. The cooling to room temperature need not be effected at a controlled cooling rate and is typically achieved by switching off the heat source used for heating, and enabling equilibration of the metal body to room temperature. During the performance of step (b), the metal body may be surrounded by a gas atmosphere of air, oxygen or inert protective gas which may be at ambient pressure, standard pressure or slightly reduced pressure (1 to 300 mbar). In the course of performance of step (b) of the process according to the invention, the aim is merely the melting and rolling of wax components; by contrast, there is no intention in this step to remove organic components by thermolysis or to trigger alloy formation between metal components. In connection with the present invention, room temperature is understood as a temperature of 25° C.

In one embodiment of the present invention, the coated metal body 1 is heated up to the melting temperature of exactly one of the wax components and then cooled down to room temperature. In another embodiment, the coated metal body 1 is heated until all the wax components have melted and then cooled down to room temperature. In a preferred embodiment, the coated metal body 1 is heated until at least half of the total mass of the wax components has melted and then cooled down to room temperature.

In step (c) of the process according to the invention, the coated metal body 2 is treated thermally in order to achieve alloy formation between metallic components of metal body and metal powder composition, so as to obtain metal body 3. The thermal treatment comprises the heating, typically in a stepwise manner, of the coated metal body 2 and subsequent cooling to room temperature. Suitable alloy conditions for step (c) are apparent from the phase diagrams of the metals involved and intermetallic phases, for example the phase diagram of Ni and Al. For example, it is possible to control the proportion of Al-rich and leachable components, such as $NiAl_3$ and $Ni_2Al_3$. The thermal treatment takes place under inert gas or under reductive conditions. Reductive conditions are understood to mean the presence of a gas mixture containing hydrogen and at least one gas which is inert under the reaction conditions; a suitable example is a gas mixture containing 50% by volume of $N_2$ and 50% by volume of $H_2$. The inert gas used is preferably nitrogen. The heating can be effected, for example, in a conveyor furnace. Suitable heating rates are in the range from 10 to 200 K/min, preferably 20 to 180 K/min. It may be advantageous to keep the temperature constant during certain periods of time in the thermal treatment, such that stepwise heating and/or cooling is effected. During the thermal treatment, the temperature is typically first increased from room temperature to about 300 to 400° C. and moisture and organic constituents are removed from the coating at this temperature for a period of about 2 to 30 minutes, then the temperature is increased to about 650 to 750° C. until an alloy is formed between metallic components of metal body and metal powder composition, and then the metal body is quenched by contact with protective gas environment at a temperature of about 200° C.

In a further aspect, the present invention further comprises processes having the following step (d): treating the metal body 3 with a basic solution. The treatment of the metal body 3 with a basic solution may serve to at least partly dissolve metal components of the metal powder composition applied and alloys between metallic components of metal body and metal powder composition, and in that way to remove them from the metal body. Typically, the treatment with basic solution removes 30% to 70% by weight of the total mass of the metal components of the metal powder composition applied and of the alloys between metallic components of metal body and metal powder composition from the metal bodies. Basic solutions used are typically aqueous basic solutions of NaOH, KOH, LiOH or mixtures thereof. The temperature in the basic treatment is typically kept within the range from 25 to 120° C. The duration of the treatment with basic solution is typically in the range from 5 minutes to 8 hours. Given suitable choice of the metallic components, it is possible to use metal bodies that are obtained as a result of the treatment with basic solution as catalysts, as disclosed, for example, in WO2019057533A1.

In a preferred embodiment, the treatment of the metal body 3 with a basic solution is performed for a period in the range from 5 minutes to 8 hours at a temperature in the range from 20 to 120° C., wherein the basic solution is an aqueous NaOH solution having an NaOH concentration between 2% and 30% by weight.

In a further aspect, the present invention further encompasses coated metallic bodies obtainable by a process according to the invention.

In a further preferred embodiment, the present invention further relates to processes and the metal bodies obtainable thereby, in which the metal body used in step (a) consists of a metal selected from the following group: Ni, Fe, Co, Cu, and in which, in step (d), metal body 3 is treated with a basic solution.

In a further preferred embodiment, the present invention further relates to processes and the metal bodies obtainable thereby,
in which the metal powder composition used in step (a) comprises one or more pulverulent metal components selected from the following group: aluminium, silicon, magnesium, alloys of aluminium and chromium, alloys of aluminium and molybdenum, alloys of aluminium and copper, alloys of aluminium and iron, alloys of aluminium and iron and chromium, alloys of aluminium and titanium, alloys of aluminium and molybdenum and titanium, alloys of silicon and chromium, alloys of silicon and molybdenum, alloys of silicon and copper, alloys of silicon and iron, alloys of silicon and iron and chromium, alloys of silicon and titanium, alloys of silicon and molybdenum and titanium, alloys of magnesium and chromium, alloys of magnesium and molybdenum, alloys of magnesium and copper, alloys of magnesium and iron, alloys of magnesium and iron and chromium, alloys of magnesium and titanium, alloys of magnesium and molybdenum and titanium,
and in which, in step (d), metal body 3 is treated with a basic solution.

In a further preferred embodiment, the present invention further relates to processes and the metal bodies obtainable thereby,
in which the metal body used in step (a) consists of a metal selected from the following group: Ni, Fe, Co, Cu,
and in which the metal powder composition used in step (a) comprises one or more pulverulent metal components selected from the following group: aluminium, silicon, magnesium, alloys of aluminium and chromium, alloys of aluminium and molybdenum, alloys of aluminium and copper, alloys of aluminium and iron, alloys of aluminium and iron and chromium, alloys of aluminium and titanium, alloys of aluminium and molybdenum and titanium, alloys of silicon and chromium, alloys of silicon and molybdenum, alloys of silicon and copper, alloys of silicon and iron, alloys of silicon and iron and chromium, alloys of silicon and titanium, alloys of silicon and molybdenum and titanium, alloys of magnesium and chromium, alloys of magnesium and molybdenum, alloys of magnesium and copper, alloys of magnesium and iron, alloys of magnesium and iron and chromium, alloys of magnesium and titanium, alloys of magnesium and molybdenum and titanium.

In a further preferred embodiment, the present invention further relates to processes and the metal bodies obtainable thereby,
in which the metal body used in step (a) consists of a metal selected from the following group: Ni, Fe, Co, Cu,
and in which the metal powder composition used in step (a) comprises one or more pulverulent metal components selected from the following group: aluminium, silicon, magnesium, alloys of aluminium and chromium, alloys of aluminium and molybdenum, alloys of aluminium and copper, alloys of aluminium and iron, alloys of aluminium and iron and chromium, alloys of aluminium and titanium, alloys of aluminium and molybdenum and titanium, alloys of silicon and chromium, alloys of silicon and molybdenum, alloys of silicon and copper, alloys of silicon and iron, alloys of silicon and iron and chromium, alloys of silicon and titanium, alloys of silicon and molybdenum and titanium, alloys of magnesium and chromium, alloys of magnesium and molybdenum, alloys of magnesium and copper, alloys of magnesium and iron, alloys of magnesium and iron and chromium, alloys of magnenum and titanium, and in which, in step (d), metal body 3 is treated with a basic solution.

In a further preferred embodiment, the present invention further relates to processes and the metal bodies obtainable thereby, in which the metal body used in step (a) consists of a metal selected from the following group: Ni, Fe, Co, Cu, and in which the metal powder composition used in step (a) comprises one or more pulverulent metal components selected from the following group: aluminium, silicon, magnesium, alloys of aluminium and chromium, alloys of aluminium and molybdenum, alloys of aluminium and copper, alloys of aluminium and iron, alloys of aluminium and iron and chromium, alloys of aluminium and titanium, alloys of aluminium and molybdenum and titanium, alloys of silicon and chromium, alloys of silicon and molybdenum, alloys of silicon and copper, alloys of silicon and iron, alloys of silicon and iron and chromium, alloys of silicon and titanium, alloys of silicon and molybdenum and titanium, alloys of magnesium and chromium, alloys of magnesium and molybdenum, alloys of magnesium and copper, alloys of magnesium and iron, alloys of magnesium and iron and chromium, alloys of magnesium and titanium, alloys of magnesium and molybdenum and titanium, and in which one or more wax components are added to the metal powder composition.

In a further preferred embodiment, the present invention further relates to processes and the metal bodies obtainable thereby, in which the metal body used in step (a) consists of a metal selected from the following group: Ni, Fe, Co, Cu, and in which the metal powder composition used in step (a) comprises one or more pulverulent metal components selected from the following group: aluminium, silicon, magnesium, alloys of aluminium and chromium, alloys of aluminium and molybdenum, alloys of aluminium and copper, alloys of aluminium and iron, alloys of aluminium and iron and chromium, alloys of aluminium and titanium, alloys of aluminium and molybdenum and titanium, alloys of silicon and chromium, alloys of silicon and molybdenum, alloys of silicon and copper, alloys of silicon and iron, alloys of silicon and iron and chromium, alloys of silicon and titanium, alloys of silicon and molybdenum and titanium, alloys of magnesium and chromium, alloys of magnesium and molybdenum, alloys of magnesium and copper, alloys of magnesium and iron, alloys of magnesium and iron and chromium, alloys of magnesium and titanium, alloys of magnesium and molybdenum and titanium, and in which one or more wax components are added to the metal powder composition, and in which, in step (d), metal body 3 is treated with a basic solution.

In a further preferred embodiment, the present invention further relates to processes and the metal bodies obtainable thereby, in which the metal body used in step (a) consists of a metal selected from the following group: Ni, Fe, Co, Cu, and in which the metal powder composition used in step (a) comprises one or more pulverulent metal components selected from the following group: aluminium, silicon, magnesium, alloys of aluminium and chromium, alloys of aluminium and molybdenum, alloys of aluminium and copper, alloys of aluminium and iron, alloys of aluminium and iron and chromium, alloys of aluminium and titanium, alloys of aluminium and molybdenum and titanium, alloys of silicon and chromium, alloys of silicon and molybdenum, alloys of silicon and copper, alloys of silicon and iron, alloys of silicon and iron and chromium, alloys of silicon and titanium, alloys of silicon and molybdenum and titanium, alloys of magnesium and chromium, alloys of magnesium and molybdenum, alloys of magnesium and copper, alloys of magnesium and iron, alloys of magnesium and iron and chromium, alloys of magnesium and titanium, alloys of magnesium and molybdenum and titanium, and in which one or more wax components are added to the metal powder composition, and in which the metal body used in step (a) is a metal foam body.

In a further preferred embodiment, the present invention further relates to processes and the metal bodies obtainable thereby, in which the metal body used in step (a) consists of a metal selected from the following group: Ni, Fe, Co, Cu, and in which the metal powder composition used in step (a) comprises one or more pulverulent metal components selected from the following group: aluminium, silicon, magnesium, alloys of aluminium and chromium, alloys of aluminium and molybdenum, alloys of aluminium and copper, alloys of aluminium and iron, alloys of aluminium and iron and chromium, alloys of aluminium and titanium, alloys of aluminium and molybdenum and titanium, alloys of silicon and chromium, alloys of silicon and molybdenum, alloys of silicon and copper, alloys of silicon and iron, alloys of silicon and iron and chromium, alloys of silicon and titanium, alloys of silicon and molybdenum and titanium, alloys of magnesium and chromium, alloys of magnesium and molybdenum, alloys of magnesium and copper, alloys of magnesium and iron, alloys of magnesium and iron and chromium, alloys of magnesium and titanium, alloys of magnesium and molybdenum and titanium, and in which one or more wax components are added to the metal powder composition, and in which, in step (d), metal body 3 is treated with a basic solution, and in which the metal body used in step (a) is a metal foam body.

EXAMPLES

A—Coating of Nickel Foam

1. Application of Metal Powder Compositions to Metal Bodies 40 g of binder solution (2.5% by weight of polyethyleneimine in aqueous solution) was first sprayed onto each of two metal foam bodies composed of nickel in flat form with a weight per unit area of 1000 g/m² and an average pore size of 580 μm (1.9 mm "300 mm" 860 mm). Directly thereafter, dry pulverulent aluminium (particle size d99=90 μm) in a mixture with 3% by weight of pulverulent Ceretan®-7080 wax (melting point in the range from 140 to 160° C.) was applied to the metal bodies (about 400 g/m²).

2. Melting and Resolidification of Wax Components

Subsequently, one of the metal foam bodies was heated to 160° C. in a laboratory oven and then cooled back down to room temperature.

3. Thermal Treatment for Alloy Formation

Thereafter, both metal foam bodies were subjected to a thermal treatment for alloy formation under a nitrogen atmosphere in a conveyor sintering furnace (manufacturer: Sarnes). The furnace was heated from room temperature to 725° C. over the course of 15 min, and the temperature was kept at 725° C. for 2 min, followed by quenching by contacting with nitrogen atmosphere at 200° C.

4. Determination of the Uniformity of Alloy Coverage

At the end, the scatter of the areas per unit weight of parts of the area of both metal foam bodies was determined, in order to obtain information as to the homogeneity of the alloy coverage of the two metal foam bodies. For this purpose, 36 circular cutouts each with a diameter of 30 mm were cut out of all areas of both metal foam bodies and weighed.

Subsequently, the PFR (powder foam ratio) was determined from:

$$PFR=100*(m[sintered]-m[original\ foam])/m[sintered],$$

with:
m[sintered]=mass of the circular cutouts each with a diameter of 30 mm that were diecut after the alloy formation
m[original foam]=mass of a circular cutout of the metal foam body with a diameter of 30 mm before the start of the experiment At the end, averages and empirical standard deviations of the series of the respective PFR values were ascertained for both metal foam bodies.

For the metal foam body that had undergone the wax melting and resolidification step, the following result was found:
Mean: 29.7
Standard deviation: 0.5

For the metal foam body that had not undergone the wax melting and resolidification step, the following result was found:
Mean: 27.7
Standard deviation: 2.3

This result shows clearly that addition of wax and a melting-recooling step prior to the thermal treatment for alloy formation achieves a distinct increase in the uniformity of alloy coverage in the metal bodies according to the invention.

B—Coating of Wire Mesh

1. Applying Metal Powder Compositions to Metal Bodies

Binder solution (2.5% by weight of polyethyleneimine in aqueous solution) was first sprayed onto two metal bodies composed of commercially available nickel wire mesh in two-dimensional form (mesh size 0.163 mm). Directly thereafter, an identical amount of dry pulverulent aluminium (particle size d99=90 μm) mixed with 3% by weight of pulverulent Ceretan®-7080 wax (melting point in the range from 140 to 160° C.) was applied to the two metal bodies.

2. Melting and Resolidification of Wax Components

Subsequently, one of the metal bodies was heated to 160° C. in a laboratory oven and then cooled back down again to room temperature. The other metal body was dried at room temperature under air for 24 h.

Thereafter, the passage of light through the two metal bodies in the case of illumination from one side with a bright lamp was examined. It was found that the metal body that had undergone the melting-resolidifying operation on the wax had much more uniform passage of light than the body dried at room temperature under air. This indicates a more homogeneous distribution of the powder applied on the metal body that was actively dried at 160° C.

3. Thermal Treatment for Alloy Formation

Thereafter, the two metal bodies were subjected to a thermal treatment for alloy formation in an industrial belt sintering furnace under a nitrogen atmosphere. The furnace here was heated up from room temperature to 725° C. over the course of 15 min, the temperature was kept at 725° C. for 2 min, followed by quenching by contacting with nitrogen atmosphere at 200° C.

C—Coating of Cobalt Foam

1. Application of Metal Powder Compositions to Metal Bodies 40 g of binder solution (2.5% by weight of polyethyleneimine in aqueous solution) was first sprayed onto two metal foam bodies composed of cobalt in two-dimensional form having a basis weight of 1000 g/m$^2$, and an average pore size of 580 μm (1.9 mm "300 mm" 860 mm). Directly thereafter, dry Al/Cr powder (containing 5% by weight of Cr) (particle size d90<63 μm, d50=35 μm) mixed with 3% by weight of pulverulent Ceretan®-7080 wax (melting point in the range from 140 to 160° C.) was applied to the metal bodies (about 400 g/m$^2$).

2. Melting and Resolidification of Wax Components

Subsequently, one of the metal bodies was heated to 160° C. in a laboratory oven and then cooled back down again to room temperature. The other metal body was dried at room temperature under air for 24 h.

Thereafter, the passage of light through the two metal bodies in the case of illumination from one side with a bright lamp was examined. It was found that the metal body that had undergone the melting-resolidifying operation on the wax had much more uniform passage of light than the body dried at room temperature under air. This indicates a less homogeneous distribution of the powder applied in the body dried at room temperature under air. This result was confirmed by SEM, which made it possible to see the closed pores and hence local overloading of this body.

3. Thermal Treatment for Alloy Formation

Thereafter, the two metal bodies were subjected to thermal treatment for alloy formation in a belt sintering furnace (manufacturer: Sarnes) under a nitrogen atmosphere. The furnace here was heated up from room temperature to 700° C. over the course of 15 min, the temperature was kept at 700° C. for 2 min, followed by quenching by contacting with nitrogen atmosphere at 200° C.

4. Determination of Uniformity of Alloy Coverage

Finally, the scatter of the basis weights of parts of the area of both metal bodies was determined, in order to obtain information as to the uniformity of alloy coverage of the two metal bodies. For this purpose, 36 circular cutouts each having a diameter of 30 mm were stamped out of all areas of each of the two metal foam bodies and weighed.

Subsequently, the PFR value was determined from:

$$PFR=100*(m[sintered]-m[starting\ body])/m[sintered],$$

with:
m[sintered]=mass of the circular cutouts punched out after alloy formation, each having a diameter of 30 mm
m[starting body]=mass of a circular cutout of the metal body having a diameter of 30 mm before commencement of the experiment Finally, averages and empirical standard deviations of the series of respective PFR values were ascertained for the two metal bodies.

For the metal bodies that had undergone the melting and resolidification step on the wax, the following result was found:

Average: 28.2

Standard deviation: 0.7

For the metal body that had not undergone the melting and resolidification step on the wax, the following result was found:

Average: 26.8

Standard deviation: 2.7

This result shows again that addition of wax and a melting-recooling step prior to the thermal treatment for alloy formation achieves a distinct increase in the uniformity of alloy coverage in the metal bodies according to the invention.

D—Coating of Nickel/Cobalt Foam

1. Application of Metal Powder Compositions to Metal Bodies 40 g of binder solution (2.5% by weight of polyethyleneimine in aqueous solution) was first sprayed onto two metal foam bodies composed of nickel/cobalt (42% by weight of nickel, 58% by weight of cobalt; produced by electroplating in layers, with template assistance) in two-dimensional form with a basis weight of 1000 g/m$^2$, and an average pore size of 580 μm (1.9 mm "300 mm" 860 mm). Directly thereafter, dry Al/Cr powder (containing 5% by weight of Cr) (particle size d90<63 μm, d50=35 μm) mixed with 3% by weight of pulverulent Ceretan®-7080 wax (melting point in the range from 140 to 160° C.) was applied to the metal bodies (about 400 g/m$^2$).

2. Melting and Resolidification of Wax Components

Subsequently, one of the metal bodies was heated to 160° C. in a laboratory oven and then cooled back down again to room temperature. The other metal body was dried at room temperature under air for 24 h.

Thereafter, the passage of light through the two metal bodies in the case of illumination from one side with a bright lamp was examined. It was found that the metal body that had undergone the melting-resolidifying operation on the wax had much more uniform passage of light than the body dried at room temperature under air. This indicates a less homogeneous distribution of the powder applied in the body dried at room temperature under air. This result was confirmed by SEM, which made it possible to see the closed pores and hence local overloading of this body.

3. Thermal Treatment for Alloy Formation

Thereafter, the two metal bodies were subjected to thermal treatment for alloy formation in a belt sintering furnace (manufacturer: Sarnes) under a nitrogen atmosphere. The furnace here was heated up from room temperature to 700° C. over the course of 15 min, the temperature was kept at 700° C. for 2 min, followed by quenching by contacting with nitrogen atmosphere at 200° C.

4. Determination of Uniformity of Alloy Coverage

Finally, the scatter of the basis weights of parts of the area of both metal bodies was determined, in order to obtain information as to the uniformity of alloy coverage of the two metal bodies. For this purpose, 36 circular cutouts each having a diameter of 30 mm were stamped out of all areas of each of the two metal foam bodies and weighed.

Subsequently, the PFR value was determined from:

PFR=100*($m$[sintered]−$m$[starting body])/$m$[sintered], with:

$m$[sintered]=mass of the circular cutouts punched out after alloy formation, each having a diameter of 30 mm $m$[starting body]=mass of a circular cutout of the metal body having a diameter of 30 mm before commencement of the experiment Finally, averages and empirical standard deviations of the series of respective PFR values were ascertained for the two metal bodies.

For the metal bodies that had undergone the melting and resolidification step on the wax, the following result was found:

Average: 28.4

Standard deviation: 0.6

For the metal body that had not undergone the melting and resolidification step on the wax, the following result was found:

Average: 27.1

Standard deviation: 2.4

This result shows again that addition of wax and a melting-recooling step prior to the thermal treatment for alloy formation achieves a distinct increase in the uniformity of alloy coverage in the metal bodies according to the invention.

E—Folding Test with Nickel Foam

1. Application of Metal Powder Compositions to Metal Bodies 40 g of binder solution (2.5% by weight of polyethyleneimine in aqueous solution) was first sprayed onto a metal foam body composed of nickel in two-dimensional form having a basis weight of 1000 g/m$^2$, and an average pore size of 580 μm (1.9 mm "300 mm" 860 mm). Directly thereafter, dry pulverulent aluminium (particle size d99=90 μm) mixed with 3% by weight of pulverulent Ceretan®-7080 wax (melting point in the range from 140 to 160° C.) was applied to the metal bodies (about 400 g/m$^2$).

2. Melting and Resolidification of Wax Components

Subsequently, the metal bodies were cut into pieces of dimensions 1.9×300×200 mm. One piece was heated to 160° C. in a laboratory oven and then cooled back down to room temperature. The other metal body was dried at room temperature under air for 24 h.

A metal body of dimensions 1.9×300×200 mm weighs about 85 g. The mass is composed of 23 g of powder, <1 g of wax and about 61 g of Ni foam.

Thereafter, the passage of light through the two metal bodies in the case of illumination from one side with a bright lamp was examined. It was found that the metal body that had undergone the melting-resolidifying operation on the wax had much more uniform passage of light than the body dried at room temperature under air. This indicates a less homogeneous distribution of the powder applied in the body dried at room temperature under air. This result was confirmed by SEM, which made it possible to see the closed pores and hence local overloading of this body.

3. Drop Test

Thereafter, the two metal bodies were weighed and then allowed to drop onto a tabletop from a height of 10 cm. Finally, the metal bodies were weighed again.

It was found that the drop onto the tabletop resulted in a loss of about 6% of the mass of the metal powder compositions applied in the case of the metal body dried at room temperature under air for 24 h, whereas the loss of mass of the metal powder composition applied was below 1% in the case of the metal body that had undergone the melting-resolidification operation.

DESCRIPTION OF THE FIGURES

FIG. 1

The figure shows two-dimensional wire mesh blanks—on the right in the original, i.e. uncoated, form and on the left in coated form, i.e. after, as described in Example B, first an aluminium powder composition and then a cycle of melting-resolidification of wax components was run. However, the aluminium powder composition was not subsequently incorporated into the alloy by thermal treatment.

FIG. 2

The figure shows the passage of light, in the case of illumination with a bright lamp from one side, through a two-dimensional blank of cobalt foam, like that used in Example C, to which, as described in Example C, a metal powder composition has first been applied and then dried at room temperature under air for 24 hours. However, the metal powder composition was not subsequently incorporated into the alloy by thermal treatment. It is apparent that the distribution of the passage of light is less uniform than in FIG. 3. Opaque regions show closed pores and hence local overloading with metal powder composition and hence indicate inhomogeneous distribution of the metal powder composition applied.

FIG. 3

The figure shows the passage of light, in the case of illumination with a bright lamp from one side, through a two-dimensional blank of cobalt foam to which, as described in Example C, a metal powder composition has first been applied, followed by running of a cycle of melting-resolidification of wax components. However, the metal powder composition was not subsequently incorporated into the alloy by thermal treatment. It is apparent that the distribution of the passage of light is much more uniform than in FIG. 2. This indicates a more homogeneous distribution of the metal powder composition applied.

FIG. 4

The figure shows scanning electron microscope (SEM) images of samples of nickel/cobalt foam, in coated form, i.e. after, as described in Example D, a metal powder composition has been applied, but which has not subsequently been incorporated into the alloy by thermal treatment. The sample shown on the left, after application of the metal powder composition, was dried at room temperature under air for 24 hours and then examined by means of SEM. The sample shown on the right, after application of the metal powder composition, was subjected to a cycle of melting-resolidification of wax components and was then examined by means of SEM. In the sample shown on the left, the closed pores and the partly uncoated metal lands are clearly apparent. In the sample shown on the right, no closed pores and homogeneous coating of the metal lands are apparent.

FIG. 5

The figure shows, on the left-hand side, a two-dimensional blank of nickel foam to which, as described in Example E, an aluminium powder composition has first been applied and then dried at room temperature under air for 24 hours. The metal powder composition was not subsequently incorporated into the alloy by thermal treatment. The figure shows, on the right-hand side, the powder residue that remained after the powder-coated foam body had been laid down and picked up again.

Figure 1:
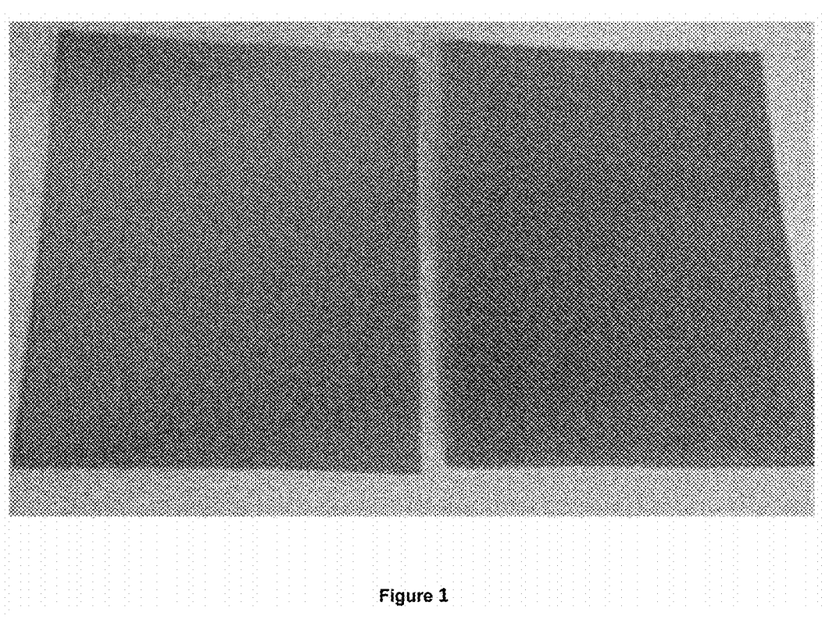
Figure 2:
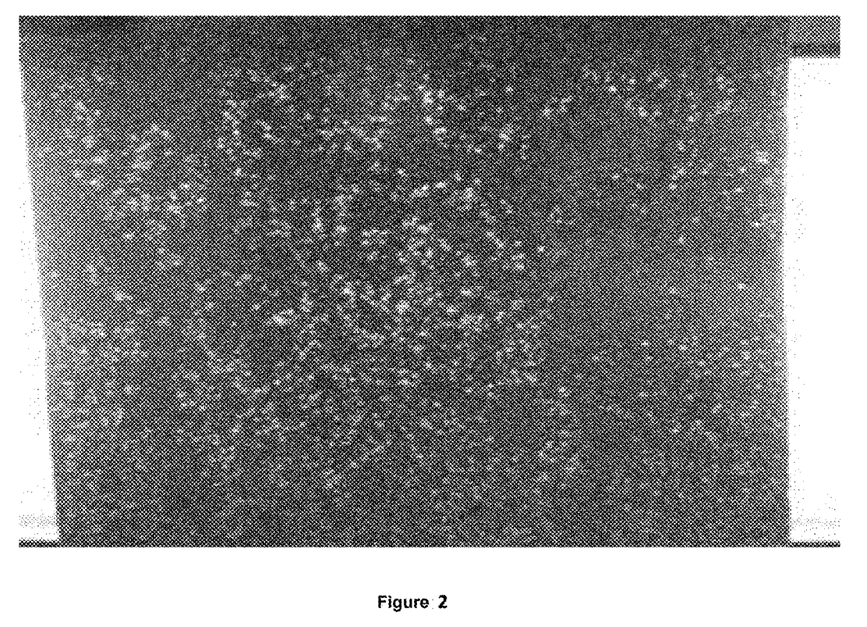
Figure 3:
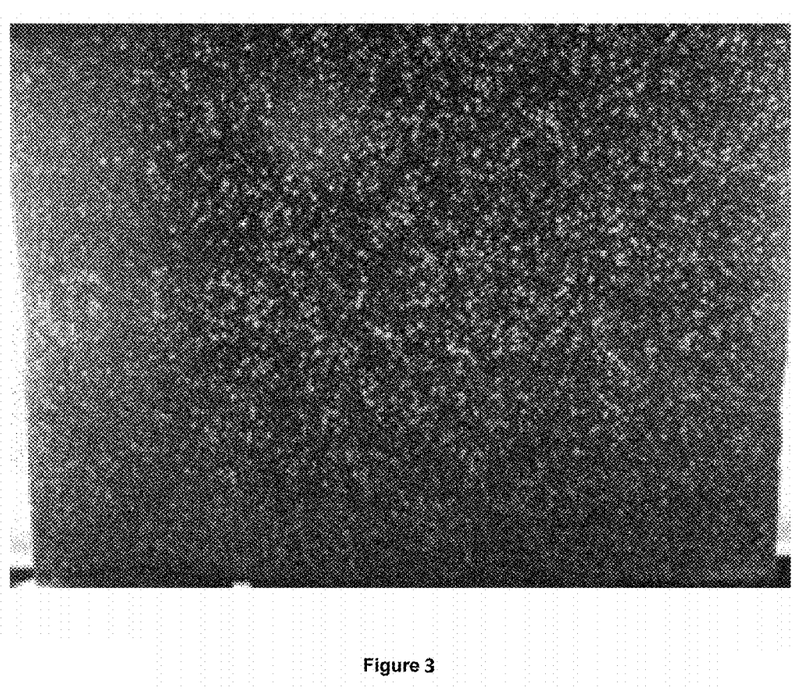
Figure 4:
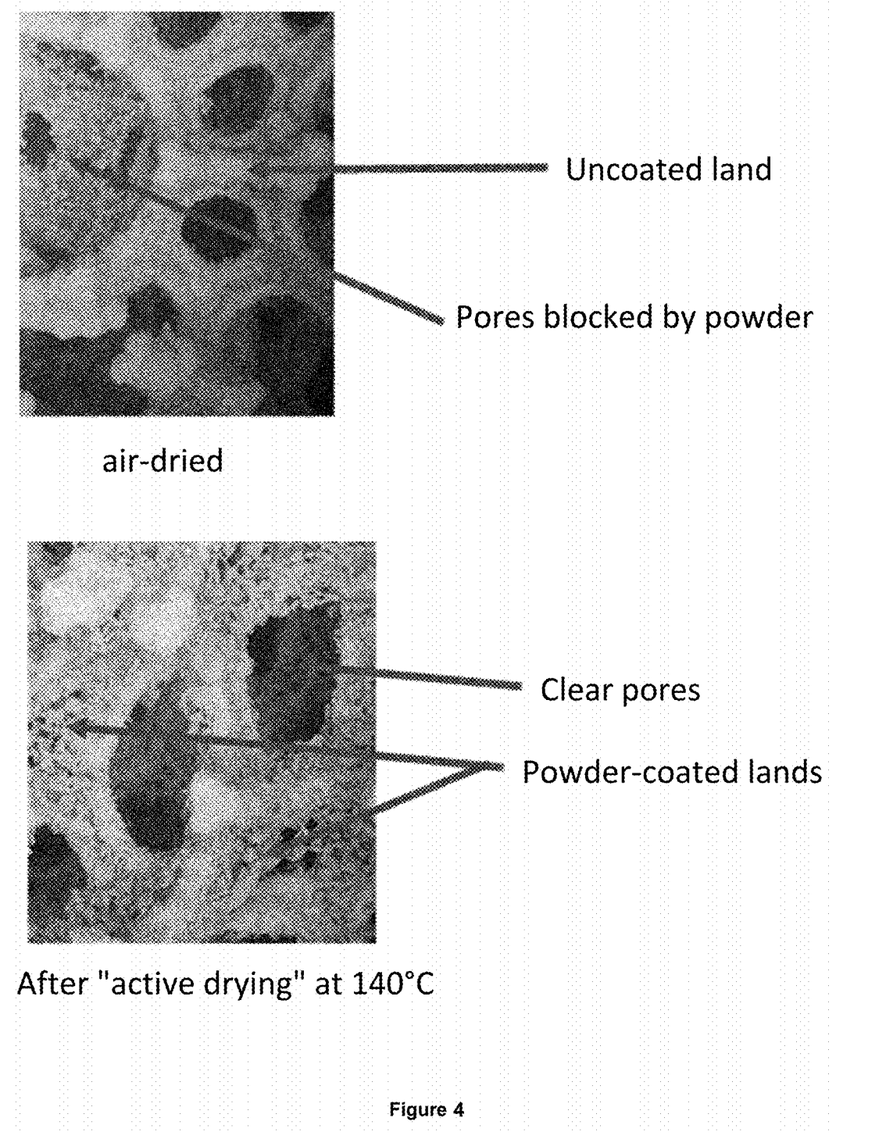
Figure 5:
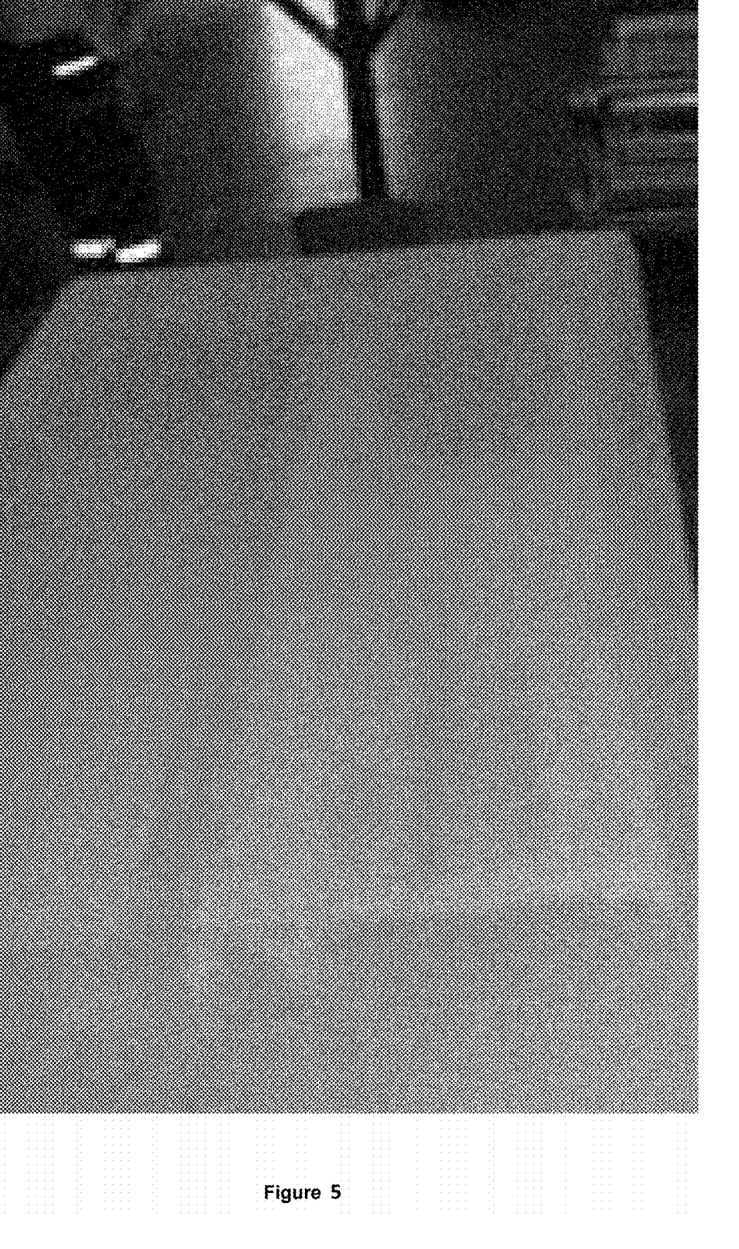

The invention claimed is:

1. A process for producing coated metal bodies, comprising the following steps:
    (a) applying a metal powder composition comprising one or more wax components to a metal body so as to obtain a coated metal body 1, the coating of which contains one or more wax components;
    (b) heating the coated metal body 1 up to the melting temperature of at least one of the wax components and then cooling it down to room temperature so as to obtain a coated metal body 2;
    (c) treating the coated metal body 2 thermally in order to form an alloy between metallic components of the metal body and the metal powder composition, so as to obtain metal body 3;
    wherein the metal body used in step (a) comprises a metal component selected from the group consisting of: nickel, cobalt, copper, and iron;
    wherein the metal powder composition used in step (a) comprises a pulverulent metal component containing aluminum, silicon or magnesium in elemental or alloyed form; and
    wherein a wax component is a substance or a substance mixture which:
        (i) is firm and kneadable at 20° C., and
        (ii) melts without decomposition in the temperature region of 40° C., and
        (iii) can be converted fully to gaseous products by thermolysis within the temperature range from 100 to 400° C.

2. The process of claim 1, wherein the metal body used in step (a) is a metal foam body.

3. The process of claim 2, wherein the metal body used in step (a) consists of one of the following:
    metallic nickel;
    metallic cobalt;
    metallic copper;
    alloy of nickel and cobalt; alloy of nickel and copper;
    arrangements of two superposed layers of two individual metallic components, in which one of the metallic components forms an inner layer of the metal body and the other metallic component forms an outer layer of the metal body, wherein the metallic components are selected from the following combinations: nickel on the inside and cobalt on the outside; iron on the inside and nickel on the outside.

4. The process of claim 3, wherein the metal body used in step (a) consists of a metal selected from the following group: Ni, Fe, Co and Cu.

5. The process of claim 4, wherein the metal powder composition used in step (a) of the process comprises one or more pulverulent metal components selected from the group consisting of: aluminum, silicon, magnesium, alloys of aluminum and chromium, alloys of aluminum and molybdenum, alloys of aluminum and copper, alloys of aluminum and iron, alloys of aluminum and iron and chromium, alloys of aluminum and titanium, alloys of aluminum and molybdenum and titanium, alloys of silicon and chromium, alloys of silicon and molybdenum, alloys of silicon and copper, alloys of silicon and iron, alloys of silicon and iron and chromium, alloys of silicon and titanium, alloys of silicon and molybdenum and titanium, alloys of magnesium and chromium, alloys of magnesium and molybdenum, alloys of magnesium and copper, alloys of magnesium and iron, alloys of magnesium and iron and chromium, alloys of magnesium and titanium, alloys of magnesium and molybdenum and titanium.

6. The process of claim 5, wherein the metal powder composition used in step (a) consists of pulverulent aluminum and one or more pulverulent wax components.

7. The process of claim 6, wherein at least one of the wax components in the coating of the coated metal body 1 obtained in step (a) has a solidification temperature in the range from 45 to 160° C.

8. The process of claim 7, wherein one or more wax components are added to the metal powder composition used in step (a).

9. The process of claim 3, further comprising:
(d) treating the metal body 3 with a basic solution.

10. The process of claim 9, wherein the treatment of metal body 3 with a basic solution is performed for a period of from 5 minutes to 8 hours at a temperature of from 20 to 120° C., and wherein the basic solution is an aqueous NaOH solution having an NaOH concentration between 2% and 30% by weight.

11. The process of claim 1, wherein the metal body used in step (a) consists of one of the following:
metallic nickel;
metallic cobalt;
metallic copper;
alloy of nickel and cobalt; alloy of
nickel and copper;
arrangements of two superposed layers of two individual metallic components, in which one of the metallic components forms an inner layer of the metal body and the other metallic component forms an outer layer of the metal body, wherein the metallic components are selected from the following combinations: nickel on the inside and cobalt on the outside; iron on the inside and nickel on the outside.

12. The process of claim 1, wherein the metal body used in step (a) consists of a metal selected from the group consisting of: Ni, Fe, Co, and Cu.

13. The process of claim 1, wherein the metal powder composition used in step (a) of the process comprises one or more pulverulent metal components selected from the group consisting of: aluminum, silicon, magnesium, alloys of aluminum and chromium, alloys of aluminum and molybdenum, alloys of aluminum and copper, alloys of aluminum and iron, alloys of aluminum and iron and chromium, alloys of aluminum and titanium, alloys of aluminum and molybdenum and titanium, alloys of silicon and chromium, alloys of silicon and molybdenum, alloys of silicon and copper, alloys of silicon and iron, alloys of silicon and iron and chromium, alloys of silicon and titanium, alloys of silicon and molybdenum and titanium, alloys of magnesium and chromium, alloys of magnesium and molybdenum, alloys of magnesium and copper, alloys of magnesium and iron, alloys of magnesium and iron and chromium, alloys of magnesium and titanium, alloys of magnesium and molybdenum and titanium.

14. The process of claim 1, wherein the metal powder composition used in step (a) consists of pulverulent aluminum and one or more pulverulent wax components.

15. The process of claim 1, wherein at least one of the wax components in the coating of the coated metal body 1 obtained in step (a) has a solidification temperature in the range from 45 to 160° C.

16. The process of claim 1, wherein one or more wax components are added to the metal powder composition used in step (a).

17. The process of claim 1, further comprising:
(d) treating the metal body 3 with a basic solution.

18. The process of claim 17, wherein the treatment of metal body 3 with a basic solution is performed for a period of from 5 minutes to 8 hours at a temperature of from 20 to 120° C., and wherein the basic solution is an aqueous NaOH solution having an NaOH concentration between 2% and 30% by weight.

19. A coated metal body produced by the process of claim 17, wherein the metal body used in step (a) is a metal foam body, wherein a standard deviation of a powder foam ratio (PFR) of at least 36 circular cutouts of the metal body 3 having a diameter of 30 mm is less or equal to 0.7.

20. A coated metal body produced by the process of claim 1, wherein the metal body used in step (a) is a metal foam body, wherein a standard deviation of a powder foam ratio (PFR) of at least 36 circular cutouts of the metal body 3 having a diameter of 30 mm is less or equal to 0.7.

* * * * *